United States Patent [19]
Merz et al.

[11] Patent Number: 5,447,588
[45] Date of Patent: Sep. 5, 1995

[54] METHOD FOR ULTRASONICALLY SPLICING WEB

[75] Inventors: Gary E. Merz, Rochester; Wallace S. Stewart, Penfield; Dale C. Marshall, Hamlin; Harold Moore, Pittsford, all of N.Y.

[73] Assignee: Eastman Kodak Company, Rochester, N.Y.

[21] Appl. No.: 252,875

[22] Filed: Jun. 2, 1994

Related U.S. Application Data

[62] Division of Ser. No. 79,024, Jun. 17, 1993, Pat. No. 5,356,682.

[51] Int. Cl.6 .............................. B32B 31/16
[52] U.S. Cl. .................. 156/73.4; 156/157; 156/159; 156/266
[58] Field of Search .............. 156/73.1, 73.4, 157, 156/159, 258, 266, 304.5

[56] References Cited

U.S. PATENT DOCUMENTS

| | | | |
|---|---|---|---|
| 766,930 | 8/1904 | Clemons | 428/57 |
| 1,303,687 | 5/1919 | Leffler | 428/57 |
| 1,747,964 | 2/1930 | Wirth | 428/57 |
| 1,921,560 | 8/1933 | Case | 95/31 |
| 3,661,667 | 5/1972 | Gardner et al. | 156/73 |
| 3,837,977 | 9/1974 | Rust | 156/580 |
| 4,018,955 | 4/1977 | Klauke et al. | 428/57 |
| 4,445,768 | 5/1984 | Gold | 354/275 |
| 4,455,076 | 6/1984 | Birkeland | 354/275 |
| 4,488,796 | 12/1984 | Edwards | 354/275 |
| 4,490,199 | 12/1984 | Dunning | 156/73.4 |
| 4,497,556 | 2/1985 | Edwards | 354/212 |
| 4,589,584 | 5/1986 | Christiansen et al. | 156/73.4 X |
| 4,629,530 | 12/1986 | Becking | 156/502 |
| 4,935,081 | 6/1990 | Becking | 156/157 |

Primary Examiner—David A. Simmons
Assistant Examiner—J. Sells
Attorney, Agent, or Firm—Charles E. Snee, III

[57] ABSTRACT

Webs (12, 14) to be spliced are provided with end edges (24, 26) which are positioned with an overlap (38), covered by a metal buffer strip (60) and joined by application of ultrasonic energy (54, 62, 64).

11 Claims, 4 Drawing Sheets

METHOD FOR ULTRASONICALLY SPLICING WEB

CROSS REFERENCE TO RELATED APPLICATION

This application is a division of application Ser. No. 08/079,024 filed 17 Jun. 1993, now U.S. Pat. No. 5,356,682.

TECHNICAL FIELD

The invention concerns methods for splicing webs and the resultant spliced webs. More particularly, the invention relates to a method for splicing webs of thermoplastic material by application of ultrasonic energy and spliced webs produced by the method.

BACKGROUND ART

Industrial processes are known in which web ends must be spliced, for example to attach the leading end of a fresh web to the trailing end of a previously processed web, to join intermediate ends of a web following a break or to join the ends of web to form an endless belt or the shell of a container.

For example, U.S. Pat. No. 766,930 shows a type of splice for an endless belt in which interlocking tongues on the ends of the belt are secured against separation by a glued-on layer of backing fabric. A similar technique is shown in U.S. Pat. No. 1,303,687 for forming the shell of a container. A different technique is shown in commonly assigned U.S. Pat. No. 3,661,667 in which the ends of strips of photographic film are joined by a length of splicing tape which is ultrasonically attached to the ends of the strips. In U.S. Pat. No. 4,445,768 and 4,455,076, the ends of a film strip and a leader strip are overlapped and joined by an undisclosed technique. Strips of pressure sensitive tape also have been used to make such splices.

A difficulty with such known splicing techniques is that a smooth joint is not formed between the ends of the spliced webs. The backing fabric or strip of tape adds substantial additional thickness at the splice, as does the overlap of the ends of the webs. Also, the ends of the backing fabric or strip of tape or the ends of the webs themselves are exposed. This additional thickness and these exposed ends can interfere with downstream web handling equipment. For example, when one of such known types of splices is used to join a leader strip to a length of photographic film, the thick splice or the exposed ends of the backing strip or the webs can snag on portions of the cartridge for the film, on portions of the camera for the film and on portions of the equipment used to process exposed film. Thus, a need has existed for a method for splicing webs which eliminates such additional thickness and exposed ends.

SUMMARY OF THE INVENTION

The invention is defined by the claims. In one embodiment, the method of the invention is especially suited for splicing the trailing end of a first web to the leading end of a second web. The leading and trailing ends are provided with transverse end edges and the end edges are overlapped. At least one of the end edges has a length substantially exceeding the transverse width of its web, thereby providing an extended edge along which material can be locally melted to join the webs. Heat is applied, preferably ultrasonically, at the overlap to locally melt the material of the end edges; and pressure is applied to cause the end edges to fuse into an essentially smooth, virtually uniform thickness joint between the webs. A metal shim preferably is placed between the overlap and the ultrasonic horn, to enhance the smoothness of the joint. In one embodiment, the end edges each comprise alternating fingers and spaces extended longitudinally of the web. The fingers tend to concentrate the ultrasonic energy and promote faster melting, with the melted material flowing into the spaces between the fingers. The fingers and spaces may be non-interlocking or dovetailed in shape. The fingers and spaces of one end edge may be offset transversely from, or aligned with, the fingers and spaces of the other end edge. Or, the fingers and spaces of one end edge may be aligned with the spaces and fingers, respectively, of the other end edge. The end edges may extend generally perpendicular or at an acute angle to the longitudinal axis of the webs. The end edge of one web may have an extended length, while the end edge of the other edge may equal the width of its web. The resultant spliced web according to the invention has a smooth splice joint with small variations in thickness and the joint is capable of sustaining substantial tensile loads.

DESCRIPTION OF THE PREFERRED EMBODIMENTS

Figure 1:
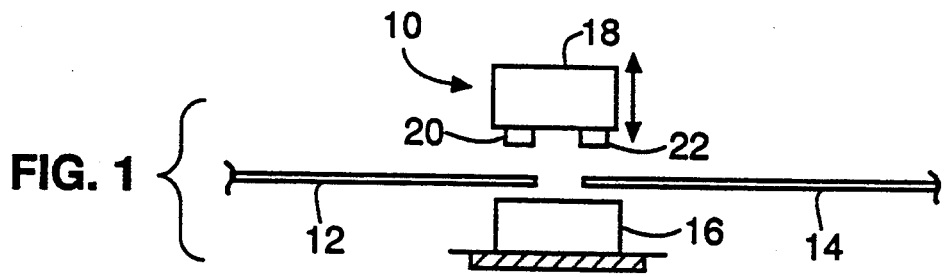
FIG. 1 shows a schematic elevation view of a die cutting apparatus suitable for preparing the ends of webs for splicing in accordance with the method of the invention.

The following is a detailed description of the preferred embodiments of the invention, reference being made to the drawings in which the same reference numerals identify the same elements of structure in each of the several Figures.

FIG. 1 illustrates schematically a conventional type of die cutter apparatus 10 for preparing the leading end of a web 12 and the trailing end of a web 14 for splicing. The webs must be made of a thermoplastic material such as polyester, and particularly good results have been achieved with polyethylene terephthalate. A typical example would be 35 mm photographic film comprising such a material as the film base. A stationary die 16 is provided which cooperates with a reciprocating punch 18 having a punch member 20 for web 12 and a punch member 22 for web 14. Of course, separate dies and punches could be provided rather than the combined apparatus illustrated.

Figure 2:
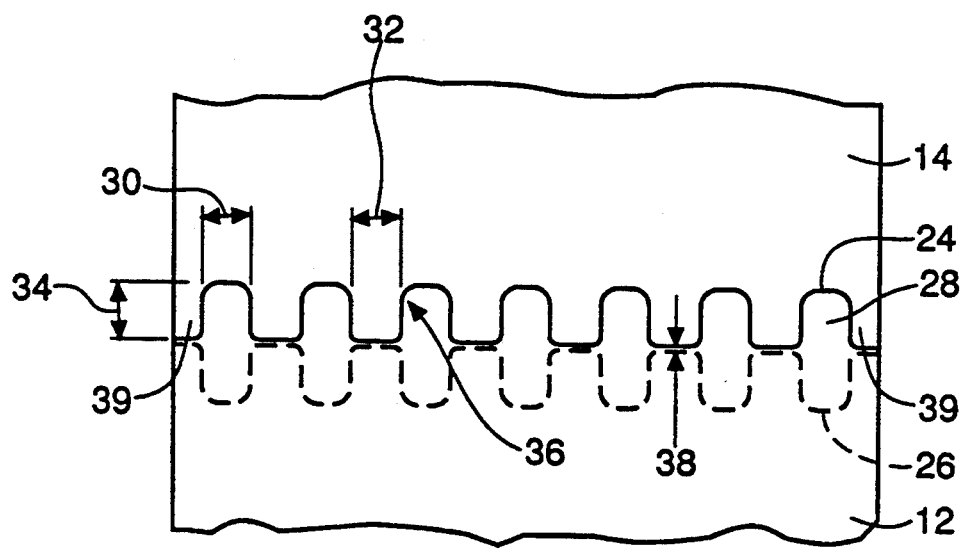
FIG. 2 shows a fragmentary plan view of two webs whose overlapped digitated end edges are aligned finger by finger and ready to be joined in accordance with the invention.

FIG. 2 illustrates webs 12 and 14 with their end edges prepared and overlapped for splicing in accordance with the invention. In this and the following Figures, end edge 24 of web 12 is illustrated on top of end edge 26 of web 14. The lengths of the end edges are substantially greater than the transverse width of their respective webs. To provide such greater lengths, a castellated or digitated end edge 24 is formed on web 12 and an identical end edge 26, shown in phantom, is formed on web 14. Preferably, end edges 24, 26 extend generally normal to the longitudinal axis of the webs. For webs such as 35 mm photographic film, the end edges preferably are formed with non-interlocking fingers 28. For example, fingers 28 may have a nominal transverse width 30 of 0.279 cm (0.110 inch), a nominal transverse space or spacing 32 of 0.203 cm (0.080 inch), an axial length 34 of 0.279 cm (0.110 inch) and corner radii 36 of 0.076 cm (0,030 inch). When ultrasonic energy is applied to the overlapped end edges using the apparatus of FIGS. 10 and 11, fingers 28 serve to concentrate the energy and cause quick localized melting along the end edges. Because of the extended length of the end edges, the molten material tends to flow into the spaces between the fingers and around the tips of the fingers, to join the webs more strongly and smoothly than would be achieved with straight cut edges. Each end edge preferably is provided at its ends with a half width finger 39 whose presence tends to minimize transverse extrusion of molten material which could form unwanted lumps at the side edges of the splice. Preferably, the end edges are aligned and overlapped finger by finger as illustrated; so that, a minimum overlap 38 of about 0.076 cm (0.030 inch) is provided between the bottom edges of spaces 32, the most closely positioned portions of the end edges. An overlap 38 of 0.076 cm has been found suitable for 35 mm photographic film having a polyester film base about 0.011 cm (0.0045 inch) in thickness.

Figure 3:
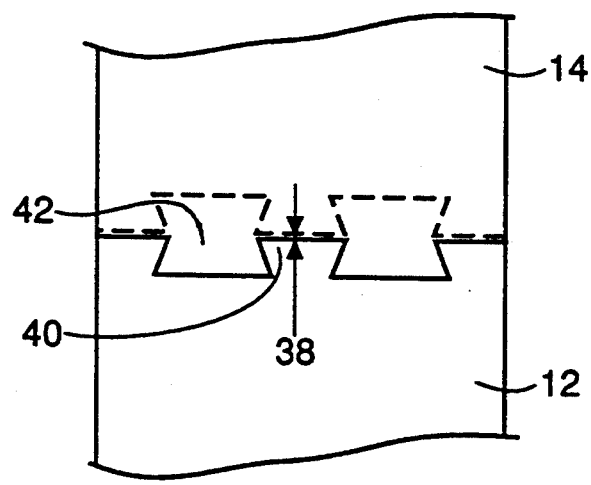
FIG. 3 shows a fragmentary plan view of two webs whose overlapped end edges have an alternative, dovetail end geometry.

FIG. 3 illustrates an alternative end edge geometry which can be spliced in accordance with the invention. Dovetail fingers 40 and dovetail spaces 42 may be used with the same overlap 38; however, in the illustrated embodiment, the width of fingers 40 is less than that of spaces 42 sufficiently that a different, but nearly complemental finger and spacing geometry must be used for the opposite edge to provide the necessary overlap 38.

Figure 4:
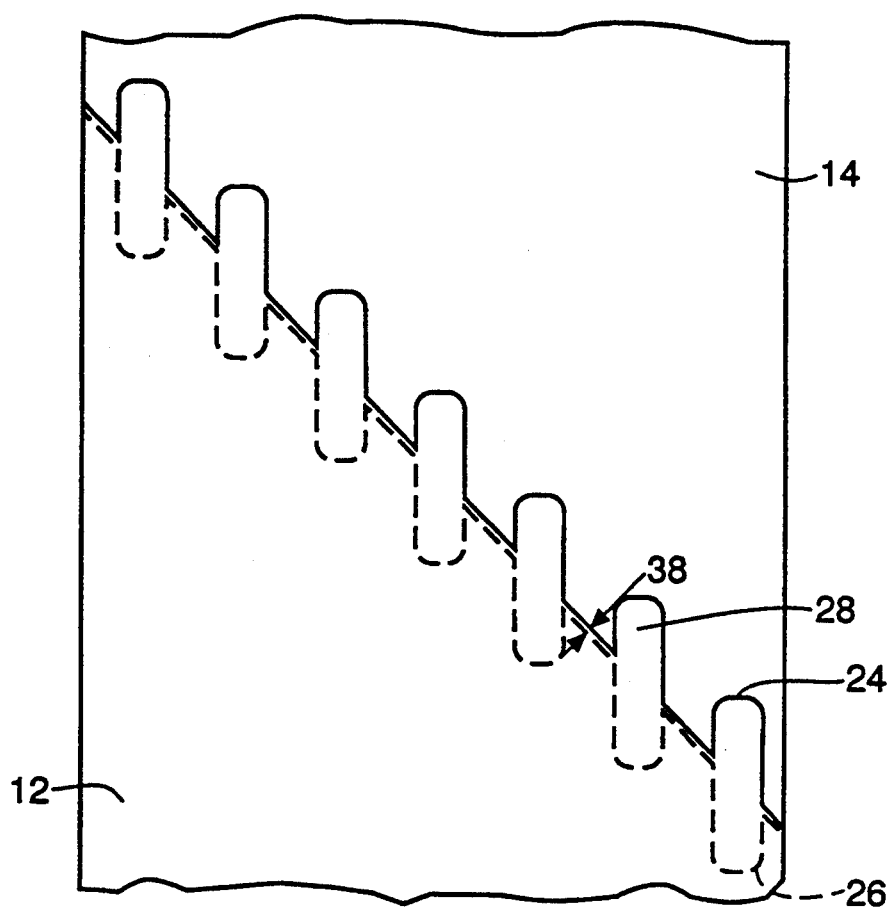
FIG. 4 shows a fragmentary plan view of two webs whose overlapped digitated end edges are aligned finger by finger but have an alternative, acute angled end geometry.
Figure 5:
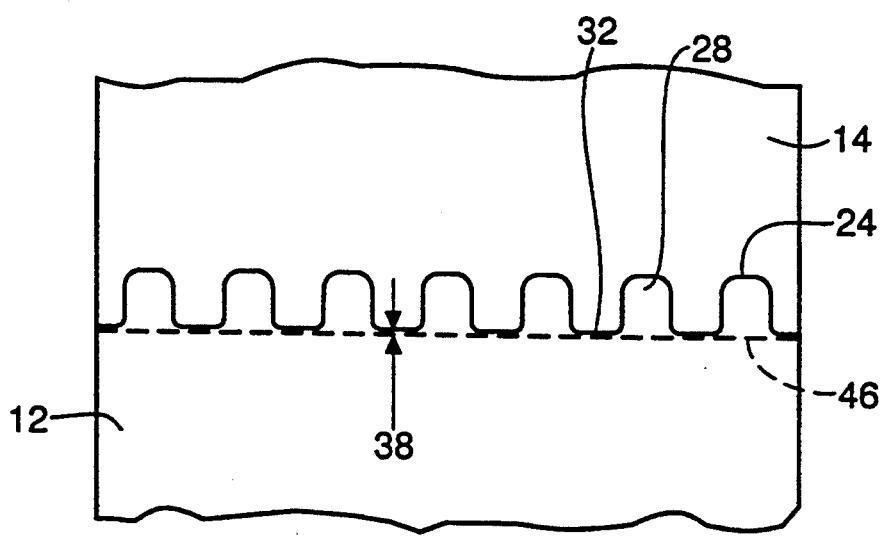
FIG. 5 shows a fragmentary view of two webs with one straight cut end edge overlapped with one digitated end edge.

FIG. 4 illustrates an alternative end edge geometry in which end edges 24 and 26 are at an acute angle to the longitudinal axis of the webs and are aligned finger by finger, as illustrated. The same minimum overlap 38 is maintained. FIG. 5 illustrates still another alternative end edge geometry in which one edge 46 is straight cut essentially normal to the longitudinal axis of web 14, while the end edge of web 12 is digitated in the manner previously described. Thus the length of edge 46 is substantially equal to the width of web 14. The same minimum overlap 38 is maintained at the bottom edges of spaces 32.

Figure 6:
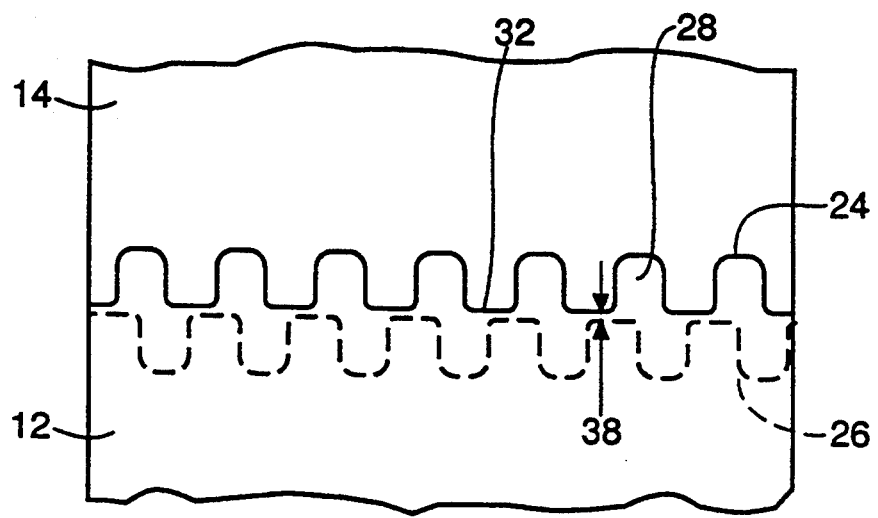
FIG. 6 shows a fragmentary plan view of two webs whose overlapped digitated end edges are offset transversely a fraction of a finger width and ready to be joined.
Figure 7:
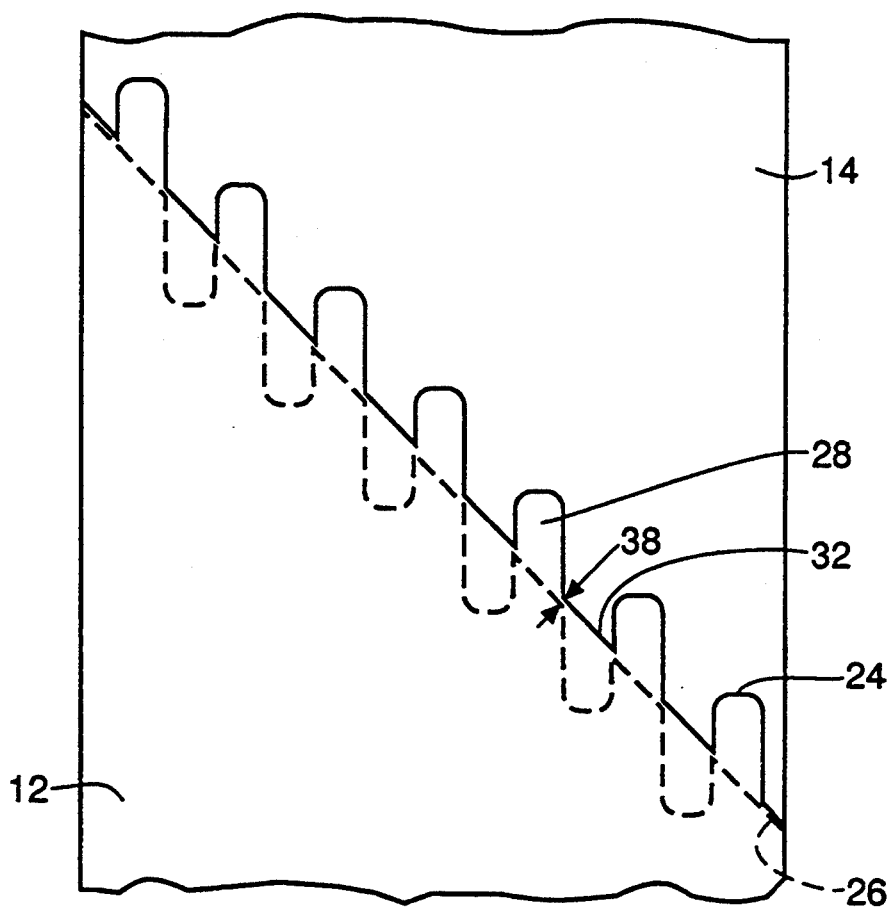
FIG. 7 shows a fragmentary plan view of two webs whose overlapped digitated end edges are aligned finger by space but have an alternative, acute angled end geometry.

FIG. 6 illustrates a further alternative end edge geometry in which the fingers 28 and spaces 32 of web 12 are offset transversely a fraction of a finger width relative to those of web 14; but minimum overlap 38 is maintained. In the embodiment of FIG. 7, end edges 24 and 26 are at an acute angle to the longitudinal axis of the webs and are aligned finger by space, as illustrated.

Figure 8:
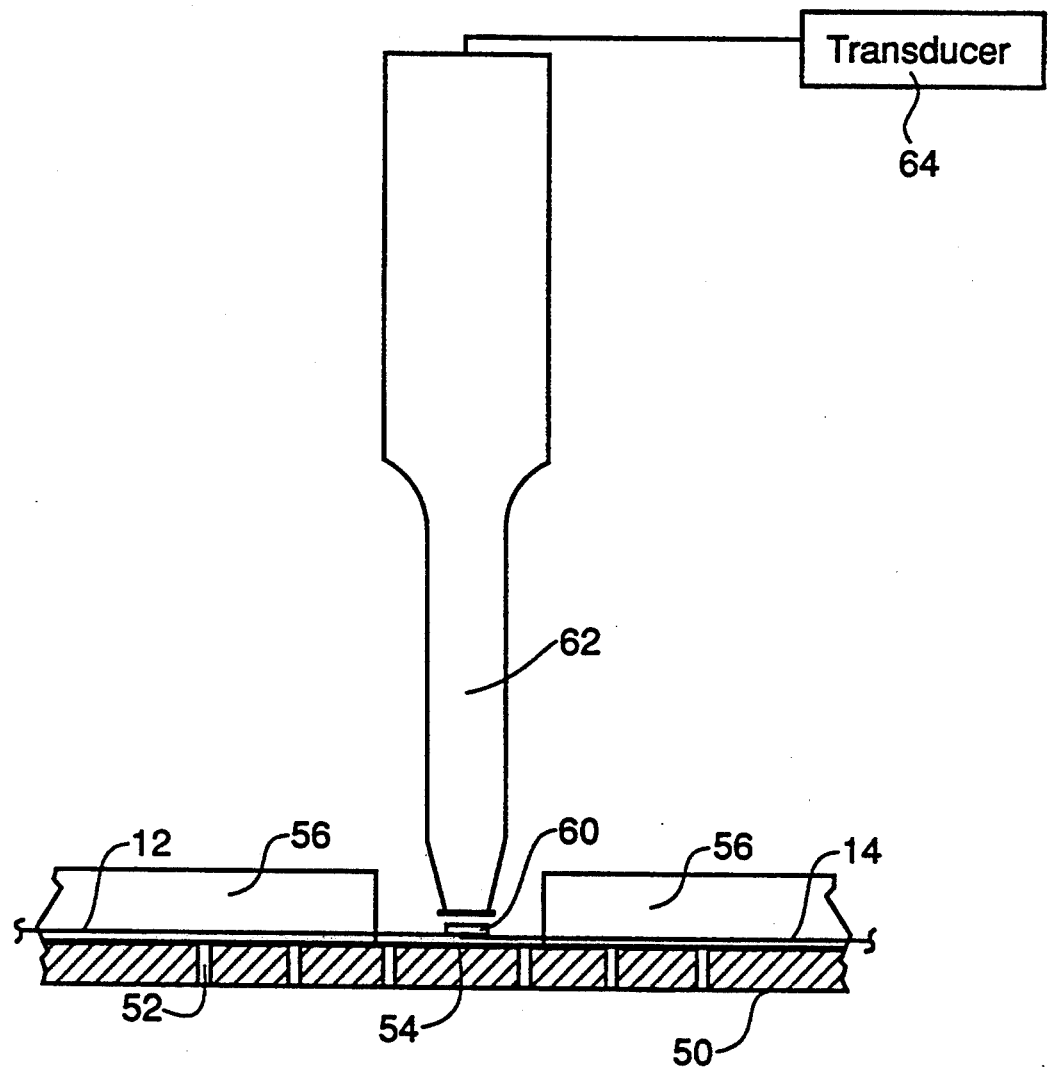
FIG. 8 shows an elevation view, partially in section, of an apparatus suitable for practicing the method of the invention, taken along line 8—8 of FIG. 9.
Figure 9:
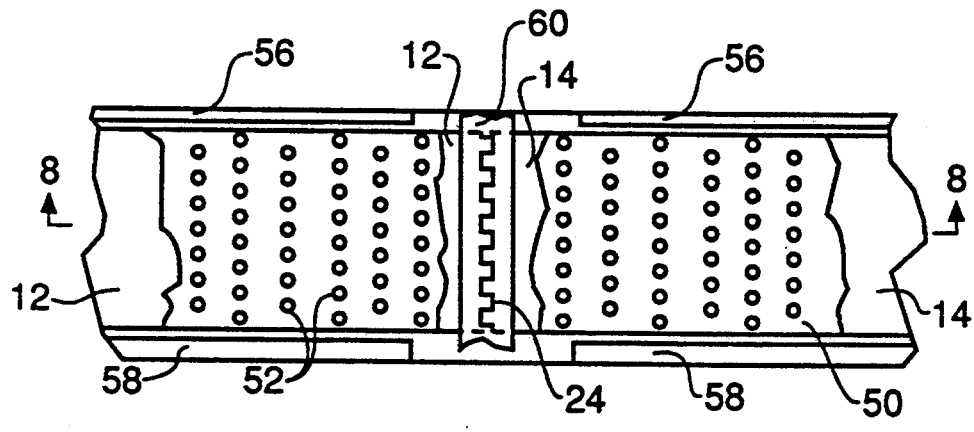
FIG. 9 shows a fragmentary plan view of the apparatus of FIG. 8, with the ultrasonic horn removed for ease of illustration.

Once the end edges have been cut in the manner just described, the splicing apparatus of FIGS. 8 and 9 can be used to splice the webs. A flat, elongated base plate 50 serves as an anvil for ultrasonically splicing the webs. A suitable pattern of vacuum apertures 52 is provided in the surface of plate 50 on either side of a central, unperforated anvil surface 54. A pair of parallel guide rails 56, 58 are provided along the edges of plate 50, to transversely position the webs. The webs are laid onto the surface of plate 50 and provided with overlap 38 at about the center of anvil surface 54. Vacuum is applied through apertures 52 to hold the ends in place. With the webs properly overlapped, a strip 60 of stainless steel shim stock, preferably about 0.004 cm (0.0015 inch) thick and wide enough to extend past the tips of the fingers on each side of the splice, is laid on top of overlap 38 to act as a buffer. To splice 35 mm photographic film, a conventional 20 kHz ultrasonic horn 62, driven by a conventional transducer 64, has been found effective. A plunge horn is preferred to a rotary ultrasonic horn due to its typically shorter cycle time. The horn is then pressed against strip 60 with 30 kg (70 lbs.) force. The ultrasonic equipment preferably incorporates a conventional microprocessor which controls the splice weld cycle parameters. When the horn tip contacts the strip a trigger delay time of 300 milliseconds is introduced which delays ultrasonic power to the transducer/horn assembly enabling pressure to build and equalize across the splice area. With the use of an encoder attached to the conventional actuator which moves the horn assembly up and down, the microprocessor is able to count to tenths of a thousandths of an inch the distance the horn tip travels during the weld time. A collapse or melt down distance of three thousandths of an inch is set in the microprocessor to control the final thickness of the film splice. The actual weld time averages 200 milliseconds with power produced reaching 600 watts. A maximum weld time is also set at 500 milliseconds and a hold time while the splice cools is set at 300 milliseconds. Strip 60 helps prevent bubbling up of the molten material and ensures a good smooth joint. Those skilled in the art will readily appreciate that adjustments in the pressure, frequency, power level and time may be necessary for webs of different materials and thicknesses or for overlaps of different widths. Vacuum is then released and the spliced web is removed from the apparatus. In spite of the presence of overlap 38 before application of ultrasonic power, the resultant spliced web exhibits an essentially smooth, flat, strong splice joint.

A splice joint formed in accordance with the invention has very little local increase in thickness, about 0,006 cm (0.0025 inch) being typical for photographic film of the type previously described, thus minimizing any tendency of the splice to snag during movement of the spliced web. The splice joint of FIG. 2, for example, is capable of withstanding tensile loads in excess of 11.36 kg (25 lbs.). No backing strip or piece of tape is required.

While our invention has been shown and described with reference to particular embodiments thereof, those skilled in the art will understand that other variations in form and detail may be made without departing from the scope and spirit of our invention.

Having thus described our invention in sufficient detail to enable those skilled in the art to make and use it, we claim as new and desire to secure Letters Patent for:

1. A method for splicing the trailing end of a first web to the leading end of a second web, comprising the steps of:
   providing each of the leading and trailing ends with a transverse end edge extended across a width of the web, at least one of the end edges having alternating fingers and spaces extended longitudinally of its respective web, to provide a length substantially exceeding the transverse width of its respective web; overlapping the end edges; and
   applying heat to locally melt the material at the end edges and pressure to cause the leading and trailing ends to join into a splice between the webs.

2. A method according to claim 1, wherein the end edges each comprise alternating fingers and spaces extended longitudinally of the web.

3. A method according to claim 2, wherein the fingers are wider transversely than the spaces by an amount equal to a desired overlap between the edges, thereby to facilitate the overlapping.

4. A method according to claim 2, wherein the fingers and spaces are dovetailed in shape.

5. A method according to claim 2, wherein the fingers and spaces of the leading end are offset transversely from the fingers and spaces of the trailing end.

6. A method according to claim 2, wherein the fingers and spaces of the leading end are aligned, respectively, with the fingers and spaces of the trailing end.

7. A method according to claim 2, wherein the fingers and spaces of the leading end are aligned, respectively, with the spaces and fingers of the trailing end.

8. A method according to claim 2, wherein the end edges are at acute angles relative to a longitudinal axis of the webs.

9. A method according to claim 2, wherein another of the end edges has a length substantially equal to the transverse width of the respective web.

10. A method according to claim 1, wherein the heat is applied ultrasonically.

11. A method according to claim 1, further comprising steps, between the overlapping and applying steps, of holding the overlapped end edges in place on an underlying plate; and placing a metal shim over the overlapped end edges.

* * * * *